US007164805B2

(12) United States Patent
Takahira

(10) Patent No.: US 7,164,805 B2
(45) Date of Patent: Jan. 16, 2007

(54) IMAGE PROCESSING METHOD AND APPARATUS, AND RECORDING MEDIUM

(75) Inventor: Masayuki Takahira, Kanagawa (JP)

(73) Assignee: Fuji Photo Film,Co, Ltd., Kanagawa (JP)

( * ) Notice: Subject to any disclaimer, the term of this patent is extended or adjusted under 35 U.S.C. 154(b) by 1070 days.

(21) Appl. No.: 10/108,332

(22) Filed: Mar. 29, 2002

(65) Prior Publication Data

US 2002/0163670 A1    Nov. 7, 2002

(30) Foreign Application Priority Data

Mar. 30, 2001    (JP)    ............................. 2001-100116

(51) Int. Cl.
*G06K 9/40* (2006.01)
*G06K 15/00* (2006.01)
*G03F 3/08* (2006.01)

(52) U.S. Cl. ..................... 382/263; 382/275; 358/3.27; 358/521

(58) Field of Classification Search ................ 382/167, 382/275, 254, 266, 260–264; 358/1.9, 3.27, 358/521

See application file for complete search history.

(56) References Cited

U.S. PATENT DOCUMENTS 6,259,537 B1 * 7/2001 Matama ....................... 358/1.9
6,603,878 B1 * 8/2003 Takemoto ................... 382/167
6,724,942 B1 * 4/2004 Arai ........................... 382/254

FOREIGN PATENT DOCUMENTS

JP          9-22460         1/1997

\* cited by examiner

*Primary Examiner*—Kanjibhai Patel
(74) *Attorney, Agent, or Firm*—Birch, Stewart, Kolasch & Birch, LLP

(57) ABSTRACT

An image processing method and apparatus enhancing sharpness of an image while suppressing enhancement of noise components. Image data is separated into frequency components, and an evaluation value for evaluating the level of an image to be enhanced is calculated for each pixel. A gain for an intermediate/high frequency component is set in accordance with the evaluation value, and multiplied by the intermediate/high frequency component, and the frequency components are synthesized. Test images, each having a density which is different from the other but constant over the test image, are prepared and an evaluation value is obtained from each of the test images as an evaluation correction value. The evaluation value of the image for processing is corrected by subtracting the evaluation correction value corresponding to the density of each pixel from the evaluation value of the image data to be processed for each pixel.

20 Claims, 7 Drawing Sheets

FIG. 4A
EXAMPLE OF TEST FILM FOR SETTING EVALUATION-VALUE CORRECTION DATA
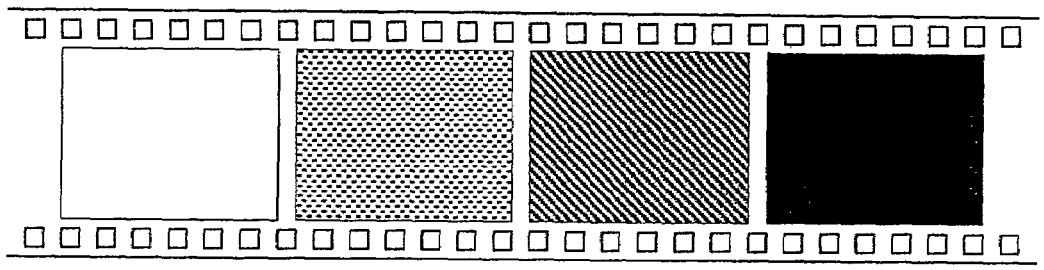
FIG. 4B
EXAMPLE OF EVALUATION-VALUE CORRECTION DATA
| DENSITY | EVALUATION CORRECTION VALUE |
|---|---|
| 100 | 30 |
| 300 | 25 |
| 500 | 22 |
| 700 | 20 |
| 900 | 20 |
FIG. 4C
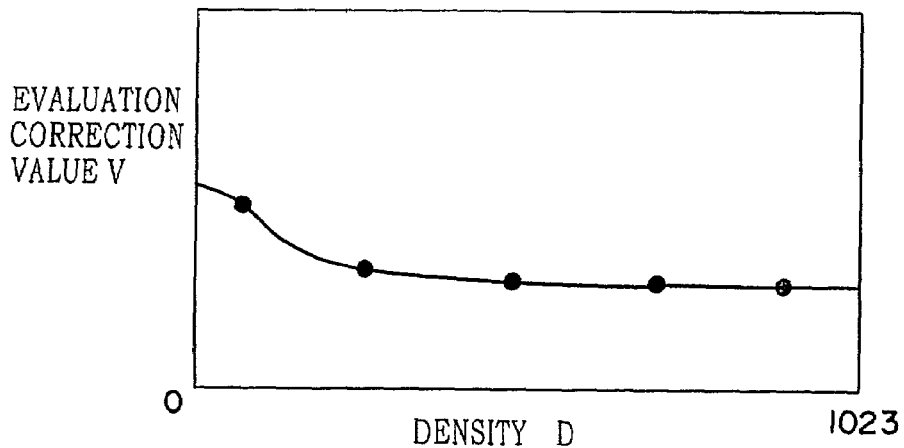

EVALUATION-VALUE CORRECTION DATA BEFORE CORRECTION

GRADATION CONVERSION CONDITION $Diu = Di + V(Di)/2$
$Did = Di - V(Di)/2$

EVALUATION-VALUE CORRECTION DATA AFTER CORRECTION $V'(Di') = Diu' - Did'$

IMAGE PROCESSING METHOD AND APPARATUS, AND RECORDING MEDIUM

BACKGROUND OF THE INVENTION

1. Field of the Invention

The present invention relates to an image processing method and apparatus, and a recording medium. More particularly, the present invention relates to an image processing method for enhancing sharpness of an image, an image processing apparatus to which the image processing method is applied, and a recording medium on which a program for allowing a computer to function as the image processing apparatus is recorded.

2. Description of the Related Art

Enhancing sharpness of an image is very effective for enhancing image quality of digital image data. However, there is a problem that if a high frequency component or an intermediate/high frequency component of spatial frequency is simply enhanced in such a manner as in unsharp masking (USM) processing, noise components superimposed on the image data are also enhanced. Particularly, film image data obtained by reading a film image recorded on a photographic film includes intermediate-to-high frequency noise components resulting from graininess of the film (hereinafter referred to as "graininess components"). The graininess components are preferably not enhanced.

Accordingly, Japanese Patent Application (JP-A) No. 9-22460 discloses a technique in which, when sharpness is enhanced by separating image data into a low frequency component, an intermediate frequency component and a high frequency component, multiplying the intermediate and high frequency components by a gain which is individually set for each component, and synthesizing these frequency components multiplied by the gains, an evaluation value, such as a correlation between colors, is obtained for each pixel, as an evaluation value for evaluating the level of an image component to be enhanced (for example, an edge component in an image). The evaluation value is compared with a threshold value which is fixedly set, and a gain is set for each pixel, or a gain corresponding to the evaluation value is set for each pixel by means of a predetermined gain curve, which is determined by the relation between the evaluation value and the gain.

In JP-A No. 9-22460, various evaluation values are disclosed as evaluation values used to evaluate the level of an image component to be enhanced separately from a noise component such as the graininess component. However, there is a problem that, when any of evaluation values is used, the level of the noise components increases compared with the level of the image component to be enhanced. Accordingly, the accuracy of the evaluation value itself decreases, and it becomes difficult to properly evaluate the level of the image component to be enhanced.

The levels of the noise components superimposed on image data is not uniform for different portions of a single image. Therefore, if sharpness is enhanced by determining the gain based on a fixed predetermined threshold value or gain curve, high gains are set for portions in which the level of a noise component is high accordingly, and intermediate and high frequency components are enhanced. As a result, noise components are also partially enhanced, and poor image quality may be produced.

SUMMARY OF THE INVENTION

The present invention has been devised in view of the aforementioned circumstances, and an object of the present invention is to provide an image processing method and apparatus, and a recording medium, which can enhance image sharpness while suppressing enhancement of noise superimposed on image data.

In order to achieve the aforementioned object, an image processing apparatus according to a first aspect of the present invention comprises: a separating means for separating image data to be processed into a plurality of different frequency components; an evaluation-value calculating means for calculating for each pixel an evaluation value for evaluating a level of an image component to be enhanced in the image data; a setting means for setting for each pixel a gain for at least one of the frequency components based on the evaluation value calculated by the evaluation-value calculating means, and a density of one of a pixel to be set and a pixel region that includes the pixel to be set; an enhancing/suppressing means for performing for each pixel one of enhancing and suppressing at least one frequency component based on the gain set by the setting means; and a synthesizing means for synthesizing the plurality of frequency components including the frequency component, which is processed, for each pixel, by the enhancing/suppressing means.

In accordance with the first aspect of the present invention, the image data to be processed is separated by the separating means into different frequency components. Separation of the image data into the frequency components can be performed by, for example, a band pass filter. Further, the evaluation-value calculating means calculates, per pixel, an evaluation value for evaluating the level of an image component to be enhanced, which may be included in the image data. Various known evaluation values can be used as the evaluation value. Specifically, parameters of color or density dispersion in the vicinity of a pixel to be calculated in an image represented by image data, color correlation (for example, a correlation in the change of density between color components), density difference, a rate of change in density, and the like can be used.

Generally, a photosensitive layer of a photographic film is formed by a plurality of layers including a layer comprised of high-sensitivity coarse grains and a layer comprised of low-sensitivity fine grains for each color. When the amount of exposure for a photographic film is relatively small, color forms only in the coarse grains. When the amount of exposure increases, color forms in the fine grains as well. In a portion of an image in which color forms only in the coarse grains, graininess components conspicuously appear. Therefore, the level of a noise component, which is mainly the graininess component, superimposed on the image data and representing the image recorded on the photographic film correlates with the amount of exposure of the photographic film, namely, the density level of the image, and the level of the noise component in each portion of the image varies depending on the density level in that portion of the image.

Even when image data obtained by photographing using a digital camera is used, the level of the noise component electrically superimposed on image data correlates with the amount of exposure at the time of photographing, that is, the density of the image represented by the image data. As the amount of exposure at the time of photographing decreases (that is, the density of the image becomes higher), the noise component superimposed on the image data appears conspicuously on the image represented by the image data.

Therefore, the level of the noise component in each portion of the image represented by the image data also varies depending on the density of that image portion.

As described above, all of the various known evaluation values (that is, the evaluation values calculated by the evaluation-value calculating means) have a drawback in that the precision of the evaluation value decreases as the level of the noise component increases relative to the level of the image component to be enhanced. The present inventors strove to develop an improvement according to which if a correlation between the level of a noise component and the density level of an image is utilized, a portion of the image, in which the level of a noise component or a possibility of the noise component being enhanced inappropriately is high, can be estimated based on the density level in each portion of the image. Therefore, in order to enhance the sharpness of an image, if the gain for those portions is set so as to relatively become smaller, enhancement of the noise components therein can be suppressed.

In the first aspect of the present invention, based on the above, a gain for at least one of the frequency components is set per pixel based on the evaluation value calculated by the evaluation-value calculating means and the density of the pixel, for which the gain is to be set or the density of a pixel region which includes the pixel for which the gain is to be set (hereinafter, this pixel and this pixel region are referred to as an object pixel). The gain of the pixels, specifically, can be changed in accordance with, for example, an evaluation value calculated by the evaluation-value calculating means for the pixels and can be set so as to become relatively smaller as the level of a noise component, which can be estimated from the density level of the pixel or the partial region including the pixel, becomes higher.

The enhancing/suppressing means emphasizes or suppresses at least one frequency component (for example, a high frequency component effective in enhancing the sharpness of an image) based on the gain set per pixel by the setting means. The synthesizing means synthesizes a plurality of frequency components, which include the frequency components enhanced or suppressed by the enhancing/suppressing means, per pixel. Thus, in the first aspect of the present invention, the sharpness of an image is enhanced by setting the gain for each pixel in consideration of the density correlating with the level of a noise component. Therefore, it is possible to emphasize the sharpness of an image while suppressing enhancement of the noise component superimposed on the image data.

Setting the gain by the setting means, specifically, can also be carried out, for example, by: (i) using an evaluation value calculated by the evaluation-value calculating means, the density of the object pixel or of each area of pixels, and a multidimensional table in which a relation of the gain to be set is set; (ii) setting a plurality of threshold values or gain curves for setting the gain based on the evaluation value calculated by the evaluation-value calculating means in correspondence with a plurality of different density levels, and changing the threshold value or gain curve to be used, in accordance with the density level; or (iii) obtaining the gains corresponding to the evaluation value calculated by the evaluation-value calculating means and thereafter re-calculating the gain in accordance with the density. However, all of the above-described methods have problems in that large-capacity storage means may be required to store data used for setting the gain, or processing becomes complicated.

Accordingly, the setting means is preferably provided so as to correct per pixel the evaluation values calculated by the evaluation-value calculating means in accordance with the density of the object pixel, and set the gain per pixel based on the corrected evaluation value. A difference between the level of an image component to be enhanced represented by the evaluation value calculated by the evaluation-value calculating means, and the level of an image component to be enhanced, which is actually included in the image data is caused by the noise component, which is superimposed over the image data. The level of the noise component correlates with the density level of the image as described above. Therefore, the level of the noise component, that is, an error of the evaluation value calculated by the evaluation-value calculating means can be estimated from the density level of the image.

The evaluation value calculated by the evaluation-value calculating means is corrected in accordance with the density level of the pixel to be set or of the pixel region including the pixel (specifically, the evaluation value is corrected so that a gain to be set becomes relatively smaller as the density level of the pixel to be set or of the pixel region including the pixel approximates to a value to raise the level of the noise component (an error of the calculated evaluation value becomes larger)), and the gain is set based on the corrected evaluation value. Therefore, information required for setting the gain comprises only information which indicates the relation between the density level and the noise component (or an evaluation value corresponding to the noise component: which evaluation value can be obtained by calculating the level of a noise component in the same manner as in the evaluation-value calculating means). Therefore, the storage capacity of the storage means in which the aforementioned information is stored can be reduced. Further, the calculated evaluation value is corrected and based on the corrected evaluation value, the gain is set. Therefore, the gain can be set by simple processing as compared with a case in which a set gain is re-calculated.

The setting means can set the gain by comparing the corrected evaluation value with a threshold value, or can set the gain by obtaining a gain corresponding to the corrected evaluation value based on the relation between a previously-set evaluation value and the gain.

Further, as the information to be stored for setting the gain, information which indicates the relation between the density level and the level of a noise component may be stored. Preferably, information which indicates the relation between the density level and an evaluation value corresponding to the noise component superimposed on image data for evaluation, which relation is previously obtained by calculating an evaluation value for each of a plurality of image data for evaluation which are generated from a plurality of test images each having a fixed density on the entire surface thereof and having difference densities or from an test image in which a plurality of patches having different densities are arranged, by the substantially same generation method as in the image represented by the image data to be processed (the plurality of image data for evaluation is a plurality of image data which respectively represent the plurality of test images, or a plurality of image data which represent the plurality of patches).

The image data for evaluation generated from the test image having a constant density on the entire surface thereof or from the patches includes no image component to be enhanced. Therefore, the information which precisely indicates the relation between the density level of an image represented by image data and the evaluation value corresponding to the noise component can be obtained. When the information is stored in the storage means, the evaluation value corresponding to the noise component at the density level of the object pixel is obtained in the setting means as an evaluation correction value for each pixel to be set, based on the information stored in the storage means, and the evaluation value calculated by the evaluation-value calculating means is corrected using the evaluation correction value, thereby allowing correction of the evaluation value.

The evaluation value corresponding to the noise component corresponds to an error of the evaluation value calculated by the evaluation-value calculating means. Accordingly, in accordance with a second aspect of the present invention, the information which indicates the relation between the density level and the evaluation value corresponding to a noise component is stored in the storage means, and the evaluation value is corrected by using the evaluation value corresponding to a noise component at the density level of a pixel to be set or a partial region including the pixel. Correcting the evaluation value to suppress enhancement of a noise component superimposed on image data can be realized by a simple calculation.

When the image data to be processed is image data which represents an image recorded on a photographic film, the relation between the noise component and the density varies depending on the type of photographic film. For example, in photographic films manufactured by the same manufacturer, of the same trade name and the like, but having different sensitivities, the characteristic curve which indicates the change in the level of a noise component to the change of the density level is similar and the noise component may change at a substantially fixed ratio with respect to the change of the density level in most cases.

Accordingly, when the image data for evaluation is image data which indicates an test image recorded on a first photographic film, and the image to be processed is image data which indicates an image recorded on a second photographic film of a type different from the first photographic film, the setting means can, based on the ratio of the level of an evaluation value corresponding to a noise component between the first and second photographic films, correct and use an evaluation correction value obtained from the information stored in the storage means.

In this case, the image data which indicates an test image recorded on the first photographic film is used as image data for evaluation, and the information which indicates the relation between the density level and the evaluation value corresponding to the noise component, which relation is previously obtained by using the image data, is stored in the storage means. When the image data to be processed is image data which indicates an image recorded on the second photographic film of a type different from the first photographic film (for example, a photographic film in which the level of an evaluation value corresponding to the noise component is set substantially at a fixed ratio to the first photographic film), the evaluation correction value obtained from the information stored in the storage means is corrected and used based on the ratio of the level of the evaluation value corresponding to a noise component between the first and second photographic films. Therefore, even when image data which indicates an image recorded on each of various types of photographic films is processed, it is unnecessary to store information corresponding to each film type, and the storage capacity of the storage means can be reduced.

Further, the image data recorded on the photographic film is subjected to gradation conversion for correcting non-linearity of the exposure amount-color formation density characteristics of the photographic film in many cases. The exposure amount-color formation density characteristics of the photographic film (particularly, a negative film) are set such that an inclination of the characteristic curve in a low exposure region and a high exposure region is small (that is, a variation in the color formation density relative to that in the exposure amount is small). Therefore, there is a problem that, due to the contrast of portions corresponding to the low exposure region of an image and corresponding to the high exposure region of the image being made higher by gradation conversion, the noise components in the portions are enhanced and the image quality deteriorates.

Accordingly, in the second aspect of the present invention, when the image data to be processed is image data subjected to gradation conversion, the setting means preferably corrects and uses an evaluation correction value in accordance with a gradation conversion condition used by the gradation conversion. The evaluation correction value can be corrected so that the evaluation correction value for a density level in which the inclination of the gradation conversion condition (that is, the change of an output to the change of an input) is large changes to a value so as to relatively decrease the gain. As a result, even when the image subjected to the gradation conversion is processed, the sharpness of an image can be enhanced while suppressing enhancement of the noise component.

Correction of the evaluation correction value can be carried out by correcting the relation between the density level represented by the information stored in the storage means, and the evaluation value corresponding to a noise component based on the inclination of the gradation conversion condition at a plurality of different densities, and by obtaining an evaluation correction value using the corrected relation.

An image processing method according to a third aspect of the present invention comprises the steps of: separating image data to be processed into a plurality of different frequency components, and calculating for each pixel an evaluation value which evaluates a level of an image component to be enhanced in the image data; setting a gain for at least one of the frequency components for each pixel based on the calculated evaluation value and a density of one of the pixel to be set and a pixel region including the pixel to be set; carrying out a process for one of enhancing and suppressing at least one frequency component for each pixel, based on the gain set for each pixel; and synthesizing the frequency components, which includes the frequency component subjected to one of enhancing and suppressing process for each pixel. Accordingly, it is possible to emphasize the sharpness of an image while suppressing enhancement of a noise component superimposed on image data in the same manner as in the first aspect of the present invention.

A recording medium according to a fourth aspect of the present invention is provided such that on which computer executable-instructions are recorded for performing processing on a computer comprising the steps of: separating image data to be processed into a plurality of different frequency components, and calculating for each pixel an evaluation value for evaluating a level of an image component to be enhanced in the image data; setting for each pixel a gain for at least one of the frequency components based on the calculated evaluation value and a density of one of a pixel to be set and a pixel region including the pixel to be set; carrying out a process for one of enhancing and suppressing at least one frequency component for each pixel based on the gain set for each pixel; and synthesizing for each pixel the frequency components, which include the frequency component subjected to one of the enhancing and suppressing process.

The processing including the first to fourth steps, that is, the program for allowing the computer to function as the image processing apparatus according to the first aspect of the present invention, is recorded on the recording medium. Therefore, due to the program recorded on the recording medium being read out and executed by the computer, the sharpness of an image can be enhanced while enhancement of a noise component superimposed on image data is being suppressed in the same manner as in the first aspect of the present invention.

BRIEF DESCRIPTION OF THE DRAWINGS

FIG. 4A is a diagram showing an example of a film for setting an evaluation-value correction data.

FIGS. 4B and 4C are a table and a graph corresponding thereto, which show examples of the evaluation-value correction data.

FIG. 6A shows an example of the evaluation-value correction data before correction; FIG. 6B shows an example of the gradation conversion conditions; and FIG. 6C shows an example of the evaluation-value correction data after correction.

DESCRIPTION OF THE PREFERRED EMBODIMENTS

Figure 1:
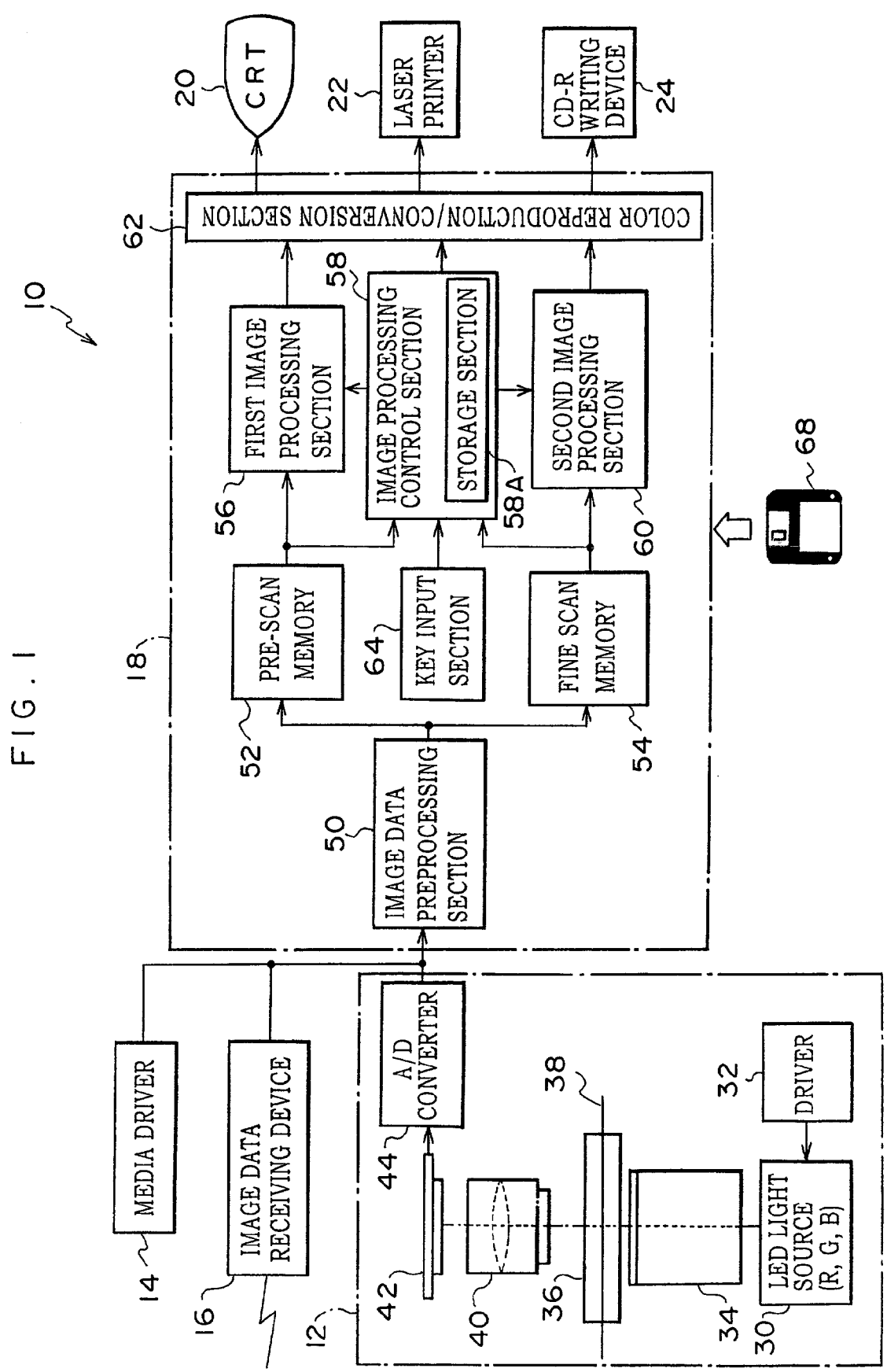
FIG. 1 is a block diagram which schematically shows a structure of an image processing system.

Referring now to the attached drawings, an example of an embodiment of the present invention will be hereinafter described in detail. FIG. 1 schematically shows the structure of an image processing system 10 according to the present embodiment. The image processing system 10 includes, as an image data input device, a film scanner 12, a media driver 14 and an image data receiving device 16, and also includes an image processing device 18 for processing image data inputted from the input device. The image processing system 10 is also provided with, as output devices for outputting image data (or an image) processed by the image processing device 18, a CRT 20 on which an image is displayed, a laser printer 22 for exposing and recording an image on a photographic printing paper, and a CD-R writing device 24 for writing image data into a CD-R.

One of various information storage media, for example, a magnetic disk such as a floppy disk (FD), an optical disk such as a CD-R, a magneto-optic (MO) disk, or a PC card, smart media or IC card (hereinafter referred to generically as a "digital camera card") which can be loaded in a digital still camera (DSC), is set in the media driver 14. The media driver 14 reads out and outputs image data stored in the information storage medium set therein. Further, the image data receiving device 16 is connected to a computer network such as the Internet, receives image data of R, G and B from an information processing device (for example, a personal computer (PC)) via the computer network, and then outputs the received image data.

The film scanner 12 is formed so as to read a film image (negative or positive images made visible by developing after a subject is photographed) recorded on a photographic light-sensitive material (hereinafter referred to as simply a photographic film), such as a photographic film 38 (for example, a negative film or a reversal film), and output image data obtained by the reading. Light, which is emitted from an LED light source 30 and processed by a light diffusion box 34 to reduce nonuniformity in the light quantity, is irradiated onto the photographic film 38 set in a film carrier 36 and transmitted through the photographic film 38. The transmitted light forms an image on a light receiving surface of an area CCD sensor 42 (or a linear CCD sensor) via a lens 40.

The film carrier 36 conveys the photographic film 38 intermittently so that the film images are sequentially positioned on the optical axis of light emitted from the LED light source 30 (that is, at a reading position). The LED light source 30 is structured such that a large number of LEDs emitting light of red (R), a large number of LEDs emitting light of green (G) and a large number of LEDs emitting light of blue (B) are each arranged over an entire surface of a substrate (not shown) at a predetermined high density. The LED light source 30 is driven by a driver 32 so as to sequentially emit light of R, G and B while a single image is located at the reading position. Thus, the film images recorded on the photographic film 38 are sequentially read by the CCD sensor 42, and R, G and B signals corresponding to the film image are outputted from the CCD sensor 42. The signals outputted from the CCD sensor 42 are converted by an A/D converter 44 into digital image data and then are inputted to the image processing device 18.

The film scanner 12, media driver 14 and image data receiving device 16 described above are each connected to an image data preprocessing section 50 of the image processing device 18 as shown in FIG. 1. The image data outputted from these image data input devices is inputted into the image data preprocessing section 50.

Attribute information which indicates the type of the inputted image data (that is, the image data generated by reading the film image using the film scanner 12 (film image data), the image data generated by photographing a subject using the DSC (DSC image data) or other image data) is added to the image data, which is inputted from the image data input device to the image processing device 18. Further, when the inputted image data is film image data, attribute information, which indicates the type of the photographic film 38 on which the film image is recorded, is added to the film image data. The film type can be detected by reading a code, which was given to the photographic film 38 or to a cartridge in which the photographic film 38 is accommodated, using a scanner (not shown) provided in the film scanner 12. This attribute information is transmitted together with the image data and inputted into an image processing control section 58, which will be described later.

In the image data preprocessing section 50, different predetermined preprocessings are carried out on the inputted image data depending on the type of the image data input device. Examples of the preprocessing for image data inputted from the film scanner 12 may include correction for darkness, density conversion, shading correction and correction of defective pixels. The preprocessing for image data inputted from the media driver 14 includes image processing such as decompression of the image data, which has been compressed and recorded on an information storage medium, improvement of sharpness, and the like. Further, examples of the preprocessing for image data inputted from the image data receiving device 16 include the decompression of the compressed image data, which was received by the image data receiving device 16 (e.g., JPEG type image data).

The film scanner 12 according to the present embodiment reads each film image recorded on the photographic film twice, at a different resolution each time. A first reading operation is performed at a relatively low resolution (hereinafter referred to as pre-scan), such that even when the density of the film image to be read is very low (for example, when an underexposed negative image on a negative film is read), the film image is read under reading conditions predetermined so to avoid unfavorable states such as a saturation of charges, which are accumulated in the CCD sensor 42.

A pre-scan memory 52 and a fine scan memory 54 are each connected to the image data preprocessing section 50. A first image processing section 56 and the image processing control section 58 are connected to the pre-scan memory 52. A second image processing section 60 is connected to the fine scan memory 54. The image data preprocessing section 50 applies the predetermined preprocessing for low-resolution image data obtained by the pre-scan and inputted from the film scanner 12, and then, outputs the image data to the pre-scan memory 52.

The image data preprocessing section 50 outputs the image data inputted from the media driver 14 and the image data inputted from the image data receiving device 16 to the pre-scan memory 52 or to the fine scan memory 54. The image data to be outputted to the pre-scan memory 52 is converted into low-resolution image data, which is equivalent to the low-resolution image data obtained by the pre-scan, and thereafter, outputted to the pre-scan memory 52. The low-resolution image data outputted to the pre-scan memory 52 is inputted to the image processing control section 58 via the pre-scan memory 52.

A single image processing personal computer (PC) in which CPU, ROM, RAM and an input/output port are connected with one another via a bus and a storage device such as a hard disk device (HDD) is connected to the input/output port can comprise both the image processing control section 58 and the first image processing section 56. The image processing personal computer is able to function as both the first image processing section 56 and the image processing control section 58 by executing predetermined programs. In FIG. 1, the storage device is shown as a storage section 58A, and the storage section 58A stores evaluation-data correction data (described later in detail) therein in advance.

When the low-resolution image data inputted via the pre-scan memory 52 is the image data obtained by the pre-scan carried out in the film scanner 12, the image processing control section 58 calculates an amount of an image characteristic, such as density, based on the low-resolution image data. Then, the reading conditions in a second reading operation (hereinafter referred to as fine scan), which is performed at a relatively high resolution, are determined for the photographic film subjected to the pre-scan by the film scanner 12, and the determined reading conditions are outputted to the film scanner 12.

Further, high-resolution image data of the same image (that is, the image data inputted from the film scanner 12 by being subjected to the fine scan, the image data inputted from the media driver 14, or the image data inputted from the image data receiving device 16) is outputted from the image data preprocessing section 50 to the second image processing section 60 via the fine scan memory 54. The image processing control section 58 automatically determines, by calculation, processing conditions for various image processing of the high-resolution image data which will be carried out by the second image processing section 60, based on the inputted low-resolution image data (set-up calculation processing). The image processing control section 58 then informs the first image processing section 56 of the processing conditions.

Examples of the image processing carried out by the second image processing section 60 to improve the image quality of an output image include a gray balance adjustment of an image, density adjustment, a gradation conversion, a hyper-tone processing for compressing a gradation of ultra-low frequency luminance components of the image, a sharpness enhancing processing for enhancing sharpness while suppressing graininess, and the like. Further, an image processing for intentionally changing the image tone (for example, an image processing for touching-up an output image to give a portrait tone) or an image processing for processing an image (for example, image processing for touching-up a human subject in an original image into a thin figure in the image) can also be carried out by the second image processing section 60.

The processing conditions for sharpness enhancing processing (Gain M and Gain H described later), which will be described later in detail, are calculated by the image processing control section 58, based on the high-resolution image data inputted from the fine scan memory 54.

Based on the processing conditions given from the image processing control section 58, the first image processing section 56 performs image processing, which is equivalent to the image processing carried out in the second image processing section 60 for the high-resolution image data, for the low-resolution image data stored in the pre-scan memory 52, and generates simulation image data. A color reproduction/conversion section 62 and a CRT 20 are sequentially connected to the first image processing section 56. The CRT 20 includes a buffer memory which holds the inputted image data, and has a function of generating an analog electric signal based on image data held in the buffer memory and displaying an image represented by the image data on the CRT 20. The simulation image data generated in the first image processing section 56 is outputted to the color reproduction/conversion section 62 and subjected to color reproduction/conversion processing, such as density conversion by the color reproduction/conversion section 62. Then, the simulation image data is outputted to the CRT 20 and displayed thereon as a simulation image (output image). The output image displayed on the CRT 20 is used by an operator to inspect a finished state of an image.

Further, a key input section 64 is connected to the image processing control section 58. The key input section 64 can comprise a keyboard or a mouse (which is connected to the input/output port of the above-described image processing personal computer). The operator inspects the output image displayed on the CRT 20 and inputs the inspection results by operating the key input section 64. When the processing conditions are determined after being inspected by the operator, the image processing control section 58 transmits the determined processing conditions to the second image processing section 60.

The second image processing section 60 includes plural types of image processing circuits used to carry out the above-described various types of image processing. When the high-resolution image data is inputted from the image data preprocessing section 50 to the second image processing section 60 via the fine scan memory 54, the second image processing section 60 executes various types of image processings for the inputted high-resolution image data in accordance with the processing conditions given from the image processing control section 58. The second image processing section 60 is connected to the color reproduction/conversion section 62. Image data outputted from the second image processing section 60 is subjected to the color reproduction/conversion processing in the color reproduction/conversion section 62, and outputted to the laser printer 22 or to the CD-R writing device 24. The outputted image data is recorded on photographic printing paper by the laser printer 22, or written into the CD-R by the CD-R writing device 24.

The laser printer 22 includes R, G and B laser light sources. R, G and B laser lights, which are emitted from the laser light sources, are each modulated based on the image data inputted from the image processing device 18 and scanned onto the photographic printing paper by being deflected by a deflecting means such as a polygon mirror, thereby allowing exposure-recording of an image on the photographic printing paper. The photographic printing paper on which the image is recorded by exposure is conveyed to a paper processor which performs color development, bleach-fixing, washing and drying processes therefor. As a result, the image recorded on the photographic printing paper is made visible.

Next, a description will be given of the operations of the sharpness enhancing processing according to the present embodiment. The sharpness enhancing processing is a processing to which the image processing method according to the present invention is applied, and is comprised of a gain determining processing carried out by the image processing control section 58 (which gain determining processing is realized due to a gain determination program being executed by the CPU of the image processing personal computer, which forms both the image processing control section 58 and the first image processing section 56), and a gain control processing carried out by the second image processing section 60. The gain determination program may be initially stored in the information storage medium 68 (see FIG. 1). In FIG. 1, the information storage medium 68 is shown as a floppy disk, but may also comprise the CD-ROM, the memory card or the like.

When the information storage medium 68 is loaded in an information readout device (not shown) incorporated in the image processing personal computer, and instructions for introducing (installing) the program from the information storage medium 68 to the image processing device 18 are given, the gain determination program is read out from the information storage medium 68 by the information readout device, and stored in the HDD of the image processing personal computer. When it is time for the gain determining processing to be carried out, the gain determination program is read out from the HDD and executed by the CPU. As a result, the image processing device 18 functions as an image processing apparatus according to the present invention.

The gain control processing can also be performed by a predetermined program (a gain control program) being executed by the image processing personal computer or another computer in the same manner as for the gain determining processing. In this case, the sharpness enhancing program, which includes the gain determination program and the gain control program, is stored in the information storage medium 68 and installation of the sharpness enhancing program is carried out as in the aforementioned manner. When it is time for the sharpness enhancing processing to be carried out, the sharpness enhancing program, which was read out from the HDD, is executed by the CPU of the computer. Thus, the computer is able to function as the image processing apparatus according to the present invention. In the above-described embodiment, the information storage medium 68 in which the sharpness enhancing program is stored corresponds to the recording medium according to the fourth aspect of the present invention.

First, the gain control processing performed by an image processing circuit, which is used only for gain control processing, in the first image processing section 56 will be described. However, the gain control processing can also be carried out with a predetermined program that is executed by a computer, instead of using the image processing circuit.

Figure 2:
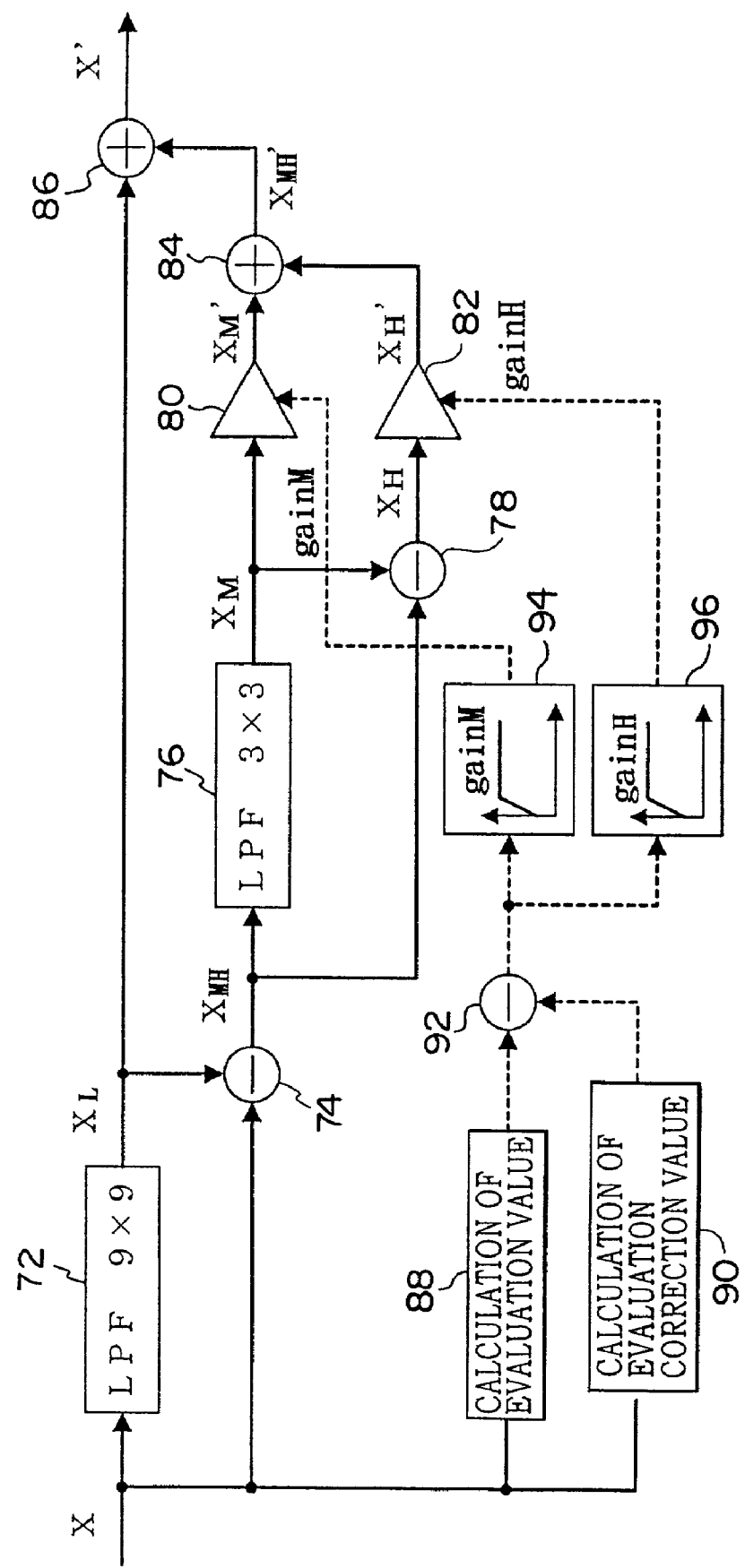
FIG. 2 is a block diagram which schematically shows contents of a sharpness enhancing processing according to an embodiment of the present invention.

As shown in FIG. 2, the above-described image processing circuit includes a 9×9 low pass filter 72. The low pass filter 72 extracts a low frequency component $X_L$ from the inputted image data X to be processed. The low frequency component $X_L$ extracted by the low pass filter 72 is inputted into a subtraction circuit 74. When the low frequency component $X_L$ is subtracted by the subtraction circuit 74 from the image data X to be processed, an intermediate/high frequency component $X_{MH}$ is extracted. Further, the intermediate/high frequency component $X_{MH}$ is inputted into a 3×3 low pass filter 76 and an intermediate frequency component $X_M$ is extracted by the low pass filter 76. The intermediate frequency component $X_M$ is inputted to a subtraction circuit 78. When the intermediate frequency component $X_M$ is subtracted from the intermediate/high frequency component $X_{MH}$ by the subtraction circuit 78, a high frequency component $X_H$ is extracted.

By performing the above-described processing, the image data X to be processed is separated into a plurality of frequency components, that is: a low frequency component $X_L$, which does not include edges nor fine texture in a color image represented by the image data to be processed (the image components to be enhanced), nor a noise component, such as a graininess component; an intermediate frequency component $X_M$ and a high frequency component $X_H$, which include both the image components to be enhanced, and the noise component. The low pass filters 72 and 76, and subtraction circuits 74 and 78 correspond to a separating means of the present invention.

The intermediate frequency component $X_M$ is inputted to a multiplication circuit 80 and the high frequency component $X_H$ is inputted to a multiplication circuit 82. A gain M determined by gain determining processing, which will be described later, for each pixel with respect to the intermediate frequency component $X_M$ is inputted to the multiplication circuit 80. The inputted gain M is multiplied by the intermediate frequency component $X_M$ using the multiplication circuit 80 and thus, a processed intermediate frequency component $X_M'$ is outputted. Similarly, a gain H determined by the gain determining processing for each pixel with respect to the high frequency component $X_H$ is inputted to the multiplication circuit 82. The inputted gain H is multiplied by the high frequency component $X_H$ using the multiplication circuit 82, and thus, a processed high frequency component $X_H'$ is outputted. The multiplication circuits 80 and 82 correspond to an enhancing/suppressing means of the present invention.

The processed intermediate frequency component $X_M'$ and processed high frequency component $X_H'$ are each inputted to and synthesized by a synthesis circuit 84. As a result, a processed intermediate/high frequency component $X_{MH}'$ is outputted from the synthesis circuit 84. The processed intermediate/high frequency component $X_{MH}'$ is, together with the low frequency component $X_L$ outputted from the low pass filter 72, inputted to a synthesis circuit 86 and synthesized with the low frequency component $X_L$. As a result, processed image data X', which has been subjected to the sharpness enhancing processing (in which the intermediate frequency component $X_M$ is enhanced or suppressed in accordance with the gain M determined by the gain determining processing and the high frequency component $X_H$ is enhanced or suppressed in accordance with the gain H determined by the gain determining processing), is outputted from the synthesis circuit 86. The synthesis circuits 84 and 86 correspond to a synthesis means of the present invention.

Figure 3:
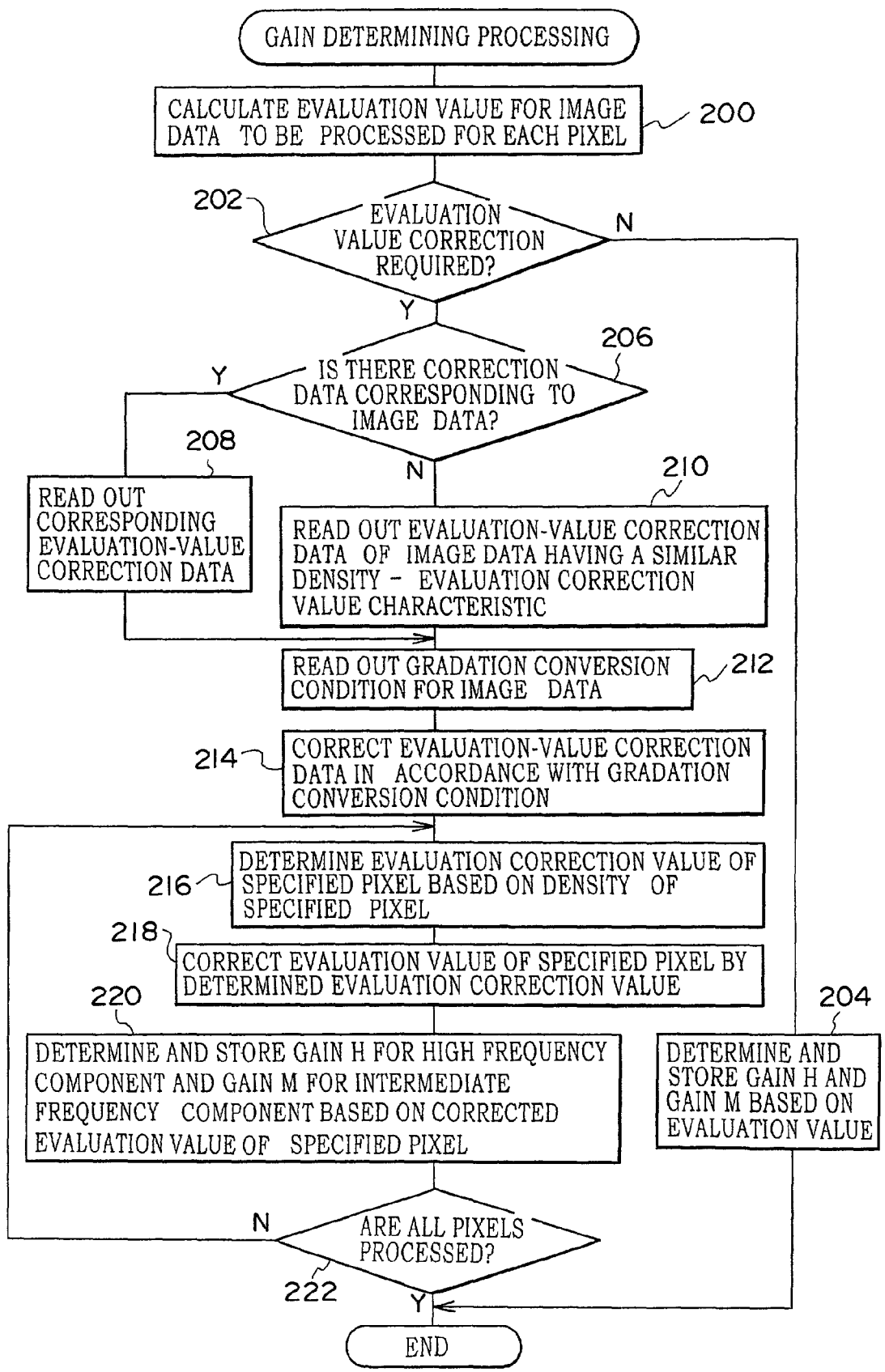
FIG. 3 is a flow chart showing contents of a gain determining processing, which is a part of the sharpness enhancing processing.

Next, the gain determining processing carried out by the image processing control section 58 will be described with reference to the flow chart shown in FIG. 3. In step 200, image data to be processed is read out, and an evaluation value E for evaluating the level of the image component to be enhanced, which is included in the read-out image data, is calculated for each pixel. The step 200 corresponds to an evaluation-value calculating means of the present invention. Further, the step 200 also corresponds to a block 88, which represents a "calculation of evaluation value", shown in FIG. 2.

In the present embodiment, as an example of the evaluation value E, a correlation value $\epsilon$ between color components $R_{MH}$, $G_{MH}$ and $B_{MH}$, which form the intermediate/high frequency component $X_{MH}$, is used. The correlation value $\epsilon$ can be obtained as described below. That is, by using data of pixels in a small region, which comprises m×m pixels (m is from 1 to 4) and includes a pixel to be evaluated, correlation values $\epsilon_{RG}$, $\epsilon_{GB}$, $\epsilon_{BR}$ between the color components of the pixel to be evaluated are calculated by the following expressions:

$$\varepsilon_{RB} = \frac{1}{(2m+1)^2} \sum_{i=-m}^{m} \sum_{j=-m}^{m} R_{MHi,j} G_{MHi,j}$$

$$\varepsilon_{GB} = \frac{1}{(2m+1)^2} \sum_{i=-m}^{m} \sum_{j=-m}^{m} G_{MHi,j} B_{MHi,j}$$

$$\varepsilon_{BR} = \frac{1}{(2m+1)^2} \sum_{i=-m}^{m} \sum_{j=-m}^{m} B_{MHi,j} R_{MHi,j}$$

In a region of the image represented by the image data to be processed which has no image component to be enhanced, but only the noise component, such as the graininess component, the color components $R_{MH}$, $G_{MH}$ and $B_{MH}$ are randomly modified by the noise component. An example of such a region is one in which there is almost no variations of image components over a relatively wide area of the image: hereinafter referred to as a flat portion. Therefore, each of the correlation values $\epsilon_{RG}$, $\epsilon_{GB}$ and $\epsilon_{BR}$ in the flat portion, generally, becomes 0, or a very small value close to 0. Further, in a region in which an edge of the image, which is the image component to be enhanced, the color components $R_{MH}$, $G_{MH}$ and $B_{MH}$ change in the same manner resulting from the image component to be enhanced. As a result, the correlation values for $\epsilon_{RG}$, $\epsilon_{GB}$ and $\epsilon_{BR}$ each become large.

In the present embodiment, the total sum $\epsilon$ of the correlation values $\epsilon_{RG}$, $\epsilon_{GB}$, $\epsilon_{BR}$ among the color components of the pixel to be evaluated is set as the evaluation value E of the pixel to be evaluated (see the expression below). However, a maximum correlation value among color components, an average correlation value among color components, a sum of the higher two correlation values among color components, or the like may also be used as the evaluation value E of the pixel to be evaluated.

$$E = \epsilon_{RG} + \epsilon_{GB} + \epsilon_{BR}$$

The evaluation value E of each pixel is obtained by carrying out the above calculation for each pixel of the image data to be processed.

In the above, the correlation values $\epsilon$ among the color components, $R_{MH}$, $G_{MH}$ and $B_{MH}$, which form the intermediate/high frequency component $X_{MH}$, are used as the evaluation value E of the pixel to be evaluated. However, the correlation value $\epsilon_M$ among color components $R_M$, $G_M$ and $B_M$ for the intermediate frequency component $X_M$ and the correlation value $\epsilon_H$ among the color components $R_H$, $G_H$ and $B_H$ for the high frequency component $X_H$ may also be obtained as the evaluation value E.

The present invention is not limited to the example in which the correlation values among the color components are used as the evaluation value E. For example, a dispersion value in a small region comprised of m×m pixels including the pixel to be evaluated may be used as the evaluation value E of the pixel to be evaluated. A dispersion value of a density when the image data to be processed is monochrome image data, a dispersion value of an average density of the color components when the image data to be processed is color image data, or the maximum value of a dispersion value of a density obtained for each of the color components). Alternatively, other physical quantities, such as the density difference in the small region (that is, a primary differential value of density) or the rate of change in density (that is, a secondary differential value of density), may also be used.

In the subsequent step 202, by referring to attribute information (information which indicates the type of the image data to be processed, and the like) applied to the image data to be processed, it is determined whether or not a correction of the evaluation value E calculated in step 200 is required for the image data to be processed. In the present embodiment, when the image data to be processed is film image data or DSC image data, the evaluation value E is corrected. When the image data to be processed is film image data or DSC image data, the determination of step 202 is affirmative and the process proceeds to step 206.

Processings of step 206 and subsequent steps correspond to a setting means of the present invention. The processings from step 206 to step 216 correspond to a block 90 represented as "calculation of evaluation value" in FIG. 3. In step 206, it is determined whether or not evaluation-value correction data corresponding to the image data to be processed is stored in the storage section 58A. The correction data corresponds to a storage means of the present invention, and will be described hereinafter.

The evaluation-value correction data according to the present embodiment is used to suppress enhancement of the noise superimposed on the image data to be processed by means of gain control processing carried out for the image data to be processed by the second image processing section 60. Further, the evaluation-value correction data is data used to correct, for each pixel, the evaluation value E (that is, the evaluation value E calculated in step 200) calculated for each of the pixels of the image data to be processed, in accordance with the density level D. In the present embodiment, evaluation-data correction data is provided for both the film image data and the DSC image data. Particularly, various kinds of evaluation-value correction data for film image data are provided for various film types.

The evaluation-value correction data for film image data corresponding to a specified film type is set up, for example, as described below. First, test images, each having a constant density over the entire surface thereof (that is, the entire surface of each test image is the flat portion) but having densities, that are different from each other, are exposed and recorded on the specified type of photographic film. The photographic film on which the test images are recorded is subjected to development and the like. As a result, a test film for setting evaluation-value correction data, such as the example shown in FIG. 4A, is prepared.

The plurality of test images may include images having different color hues (for example, images which form a Macbeth chart) or may have the same color hue (for example, gray). A case in which four test images are formed is shown as an example in FIG. 4A. However, the number of test images is not particularly limited to four. Further, a single test image comprising a plurality of test portions (patches) similar to the aforementioned plurality of test images are arranged can also be used.

Next, a reading means such as the film scanner 12 reads the plurality of test images, whereby test image data for each of the test images is generated and the density level D of each test image is obtained from the corresponding test image data. The evaluation value E is calculated for each of the test image data in the same manner as in the above-described step 200. It is not necessary to calculate the evaluation value E for every pixel, as in step 200, because the test image has a constant density over the entire surface thereof. Accordingly, a single representative evaluation value E for each of the test image data (hereinafter referred to as the representative value E) can be obtained, for example, by calculating the evaluation values E for predetermined pixels in each of the test image data, and then calculating an average value from these evaluation values E.

As described above, the test image has a constant density over the entire surface thereof, and therefore, the test image data, which represents the test image, includes no image component to be enhanced. Accordingly, the representation value E corresponds to an evaluation of the value of the noise component (particularly, the graininess component which is a main component of the noise component) in a portion of the density D of the test image. In the present embodiment, the evaluation value E obtained from the image data to be processed is corrected using the representative value E. The corrected evaluation values E obtained from the image data to be evaluated will be referred to hereinafter as a correction value V.

The correction data, which is stored in the storage section 58A, may be data which indicates a relation between the density level D and the evaluation correction value V, an example of which is shown as a curve in FIG. 4B, or data in which the above relation can be estimated by a simple calculation such as interpolation. The evaluation correction value V comprises data which discretely represents the above-described relation, and therefore, for example may be stored in the storage section 58A as evaluation-value correction data.

Further, data indicating the relation between the density level D and the evaluation correction value V and generated by using the evaluation correction values V may be stored in the storage section 58A as evaluation-value correction data. When the image data to be processed is data that indicates the density level of each pixel by 10-bit representation (at 1024 levels from 0 to 1023) as shown in FIG. 4B, for example, a representative corrected value V, which is obtained by interpolating each of the evaluation correction values V, may be stored as the evaluation-value correction data.

Moreover, in order to reduce a storage capacity required for storing evaluation-value correction data, after data which continuously represents the relation between the density level D and the evaluation correction value V has been generated, parts of the generated data may be appropriately omitted as in the diagram shown in FIG. 4B, so that only the evaluation correction values V at predetermined density values need to be stored in the storage section 58A as the evaluation-value correction data. Intervals between the density values, at which the evaluation correction values V are stored, may be constant, as shown in the diagram of FIG. 4B, or may be non-constant such that the interval of density level becomes smaller in a portion in which the change of the evaluation correction value V with respect to the change of density level D is large.

As described above, the evaluation-value correction data is obtained by using the test images, which each have a constant density on the entire surface thereof, but different densities different from each other, are formed on the specified type of photographic film. As a result, the evaluation-value correction data which precisely indicates the relation between the density level D and the evaluation value corresponding to the noise (evaluation correction value V) can be obtained for the image data to be processed.

In the present embodiment, a large number of film types, which can be read by the film scanner 12, are each classified into one of a plurality of groups such that film types having the same relationship between the density level and the noise component (that is, the relationship between the density level D and the evaluation correction value V) are put in the same group. For each group, the evaluation-value correction data is obtained for a single film type which will represent the group. The evaluation-value correction data of the film type (hereinafter referred to as a "representative film type"), which represents each group, is stored in the storage section 58A together with information for associating the film types with the groups to which the film types belong.

When the image data of the image to be processed is film image data, it is determined in the previous step 206, based on the attribute information, whether correction data for the film type of the image to be processed is recorded is being stored in the storage means 58A.

A main component of the noise components superimposed on DSC image data is the noise component generated by electric circuits or the like incorporated into the DSC. Even though there is a possibility that the noise component superimposed on the DSC image data may vary depending on the type of the DSC used for photographing of a subject, a possibility that the relation between the density level of the image represented by the DSC image data and the noise component may vary greatly between different types of DSC is small.

Accordingly, when the image data to be processed is DSC image data, test subjects that have a constant density over the entire surface, but having different density levels are each photographed using plural types of the DSC in which the total level of noise components differ from one another (for example, the DSC in which the total level of noise components is high, normal and low). Correction data is calculated for each of the DSC types (that is, for each total level of noise component) using the plurality of image data for evaluation obtained by photographing in a manner substantially the same as for the film image data. The calculated evaluation-value correction data is stored in the storage section 58A. When the image data to be processed is the DSC image data, the determination of step 206 is affirmative unconditionally.

When the determination of step 206 is affirmative, the process proceeds to step 208 and evaluation-value correction data corresponding to the image data to be processed is read out from the storage section 58A. Specifically, when the image data to be processed is film image data, evaluation-value correction data of the same film type as the photographic film on which a film image represented by the image data to be processed is recorded is read out. Further, when the image data to be processed is DSC image data, the level of the noise component is detected (in this case, the level of the noise component can be detected by, for example, an operator inspecting a simulation image displayed on the CRT 20, and inputting the result of determination about the level of the noise component via the key input section 64), and evaluation-value correction data corresponding to the detected level of noise component is read out.

When the determination of step 206 is negative (that is, when the image data to be processed is the film image data and the evaluation-value correction data for the same film type is not stored in the storage section 58A), the process proceeds to step 210 and evaluation-value correction data for the representative film type (that is, the film type having the same relation between the density level D and the evaluation correction value V as that of the film type corresponding to the image data to be processed) is read out from the storage section 58A. In step 210, the read-out evaluation-value correction data is corrected as necessary.

Figure 5:
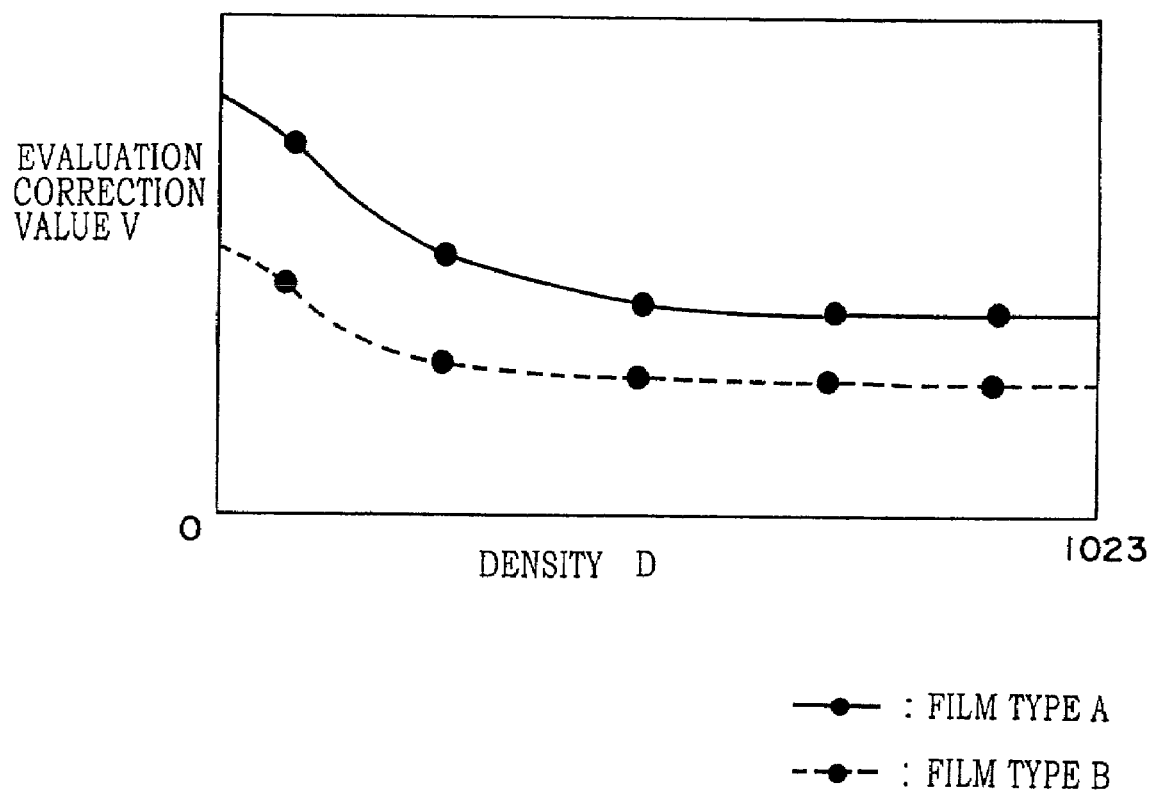
FIG. 5 is a graph which illustrates a processing for obtaining the evaluation-value correction data of a specified film type by correcting the evaluation-value correction data of another film type.

For photographic films manufactured by the same manufacturer, having the same product name and the like, but different sensitivities: the noise components change similarly with respect to the change of density level; and the evaluation correction value V corresponding to each film type often changes at a substantially constant ratio with respect to the change of density level D in most cases (for example, see the solid line and the broken line in FIG. 5). Accordingly, in the present embodiment, the film types in which the evaluation correction values V change at a substantially constant ratio with one of the representative film types are classified into the same group as the representative film type, regardless of the density level D, and the ratio of the evaluation correction value V with respect to the evaluation correction value V of the representative film type are stored in advance in the storage section 58A.

Thus, in step 210, when the film type corresponding to the image data to be processed has the above relation to the representative film type, the ratio of the evaluation correction value V stored in the storage section 58A is read out and the evaluation-value correction data of the representative film type previously read out is corrected by modifying the evaluation correction value V at each density level in accordance with the above-described ratio.

The contrast of an image represented by image data, which has been subjected to gradation conversion changes with respect to an image represented by original image data in accordance with an inclination γ of a gradation conversion condition. As the contrast becomes higher, the degree of enhancement of the noise component superimposed on image data also becomes higher. The inclination γ of the gradation conversion conditions generally varies for each density level. Therefore, the rate of change of the contrast of an image subjected to gradation conversion is different for each density level and the degree to which the noise component in the image data subjected to gradation conversion is enhanced or suppressed also varies for each density level.

Figure 6A:
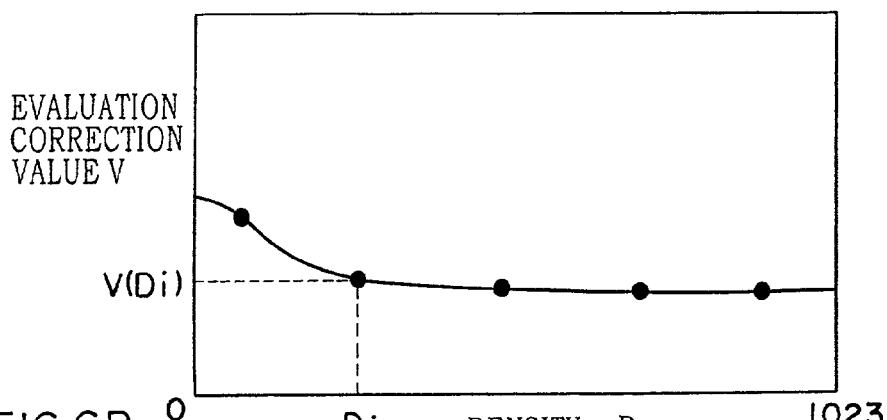
FIGS. 6A to 6C are graphs for illustrating a correction of evaluation-value correction data corresponding to a gradation conversion condition.
Figure 6B:
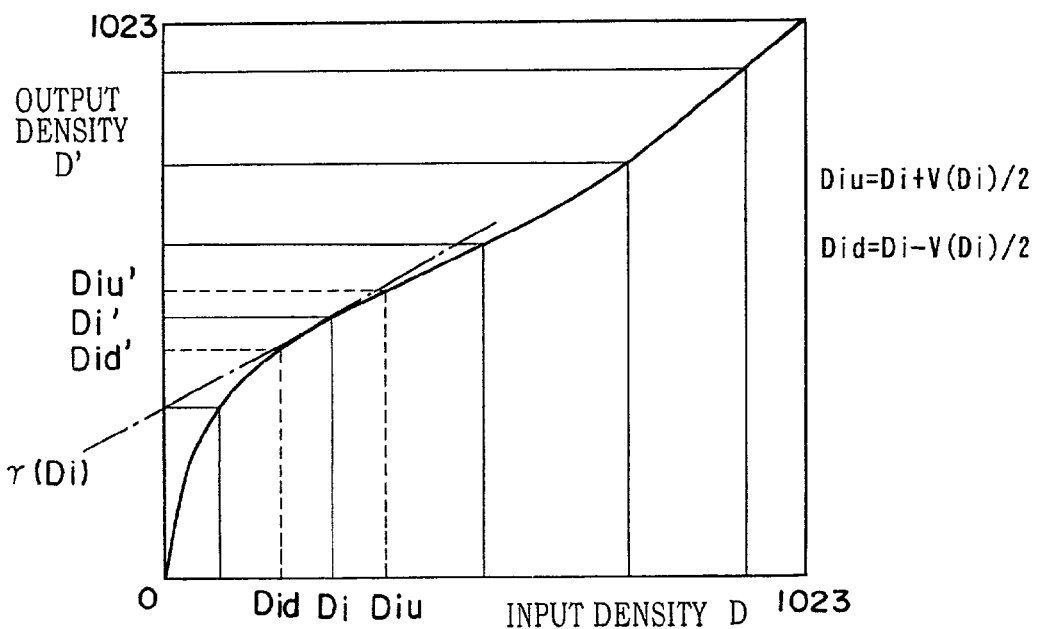

In order to correct non-linearity of the relation between an exposure amount of photographic film and coloring density characteristics, the gradation conversion conditions for film image data, in particular, is generally set such that the inclinations in low-density regions and high-density regions are each made relatively large, as shown in FIG. 6B. Therefore, due to the contrast of the low-density region (a region of a low exposure amount), which originally included many noise components such as graininess components, being increased by gradation conversion, the noise components such as graininess components are further enhanced, thereby resulting in deterioration of image quality.

For this reason, after processing of step 208 or step 210 is carried out, the process proceeds to step 212, and in the second image processing section 60, a gradation conversion condition to be carried out before the gain control processing (that is, a gradation conversion condition determined by set-up calculations in the image processing control section 58 and inspection by an operator) for the image data to be processed is read out. In step 214, the evaluation-value correction data acquired in step 208 or step 210 is corrected in accordance with the gradation conversion conditions read-out at step 212.

Correction of evaluation-value correction data in accordance with the gradation conversion condition can be performed by, for example, obtaining the inclination γ of the gradation conversion condition (for example, an inclination γ (Di) at the density level Di shown in FIG. 6B) for each of the different density regions, and in density regions in which the inclination γ is greater than 1, increasing the evaluation correction value V as the inclination γ increases and in density regions in which the inclination γ is less than 1, decreasing the evaluation correction value V as the inclination decreases.

Figure 6C:
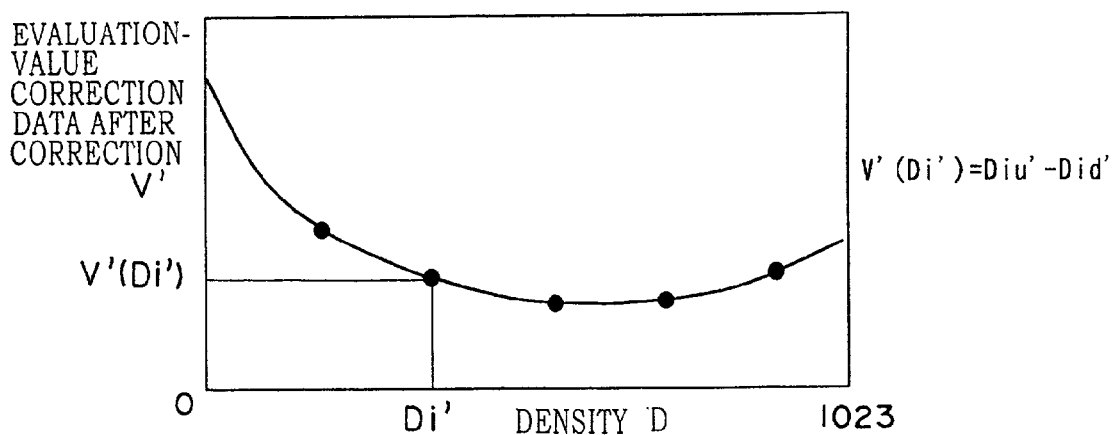

Specifically, for example, in a case in which the evaluation-value correction data discretely represents the relation between the density level D and the evaluation correction value V as indicated by "●" shown in FIG. 6A, when, for example, gradation conversion is carried out under the gradation conversion conditions shown in FIG. 6B, an evaluation correction value V(Di) is obtained from a known density level Di (see FIG. 6B), and a density level, Diu, generated by the formula, Diu=Di+V(Di)/2, is converted under the gradation conversion condition to obtain a density level Diu'. Further, a density level, Did, generated by the formula: Did=Di−V(Di)/2, is converted by the gradation conversion to produce a density level Did'. As shown in FIG. 6C, the evaluation correction value V'(Di') is obtained after the correction by the formula V'(Di')=Diu'−Did', and the corrected evaluation correction value (V'(Did')) is associated with the density level Di' obtained by converting the density level Di by gradation conversion. This processing is carried out for each density level for which the evaluation correction value V is known, so as to obtain evaluation-value correction data corrected in accordance with the gradation conversion conditions. The above-described steps 212 and 214 correspond to a setting means of the present invention.

When correction of the evaluation-value correction data in accordance with the gradation conversion condition has been completed, in step 216, the density level of a specified pixel (a pixel for which the grain is to be set or a region of pixels including the specified pixel; for example, a region comprised of m×m (m≧2) pixels, hereinafter both this pixel and this pixel region are referred to as the specified pixel) is acquired from the image data to be processed by calculation, and based on the relation between the density level D represented by evaluation-value correction data and the evaluation correction value V, an evaluation correction value V of the specified pixel corresponding to the acquired density level is obtained.

In step 218, the evaluation value E for the specified pixel calculated in the aforementioned step 200 is read-out, and by subtracting the evaluation correction value V obtained in step 216 from the read-out evaluation value E, the evaluation value E of the specified pixel is corrected (corrected evaluation value: E'=E−V). The step 218 corresponds to a subtraction circuit symbol 92 shown in FIG. 2. In the subsequent step 220, based on the corrected evaluation value E' of the specified pixel, the gain M for the intermediate frequency component $X_M$ and the gain H for the high frequency component $X_H$ are determined, and the determined gain M and gain H are stored in RAM or the like. This step 220 also corresponds to the symbols 94 and 96, shown in FIG. 2.

Figure 7A:
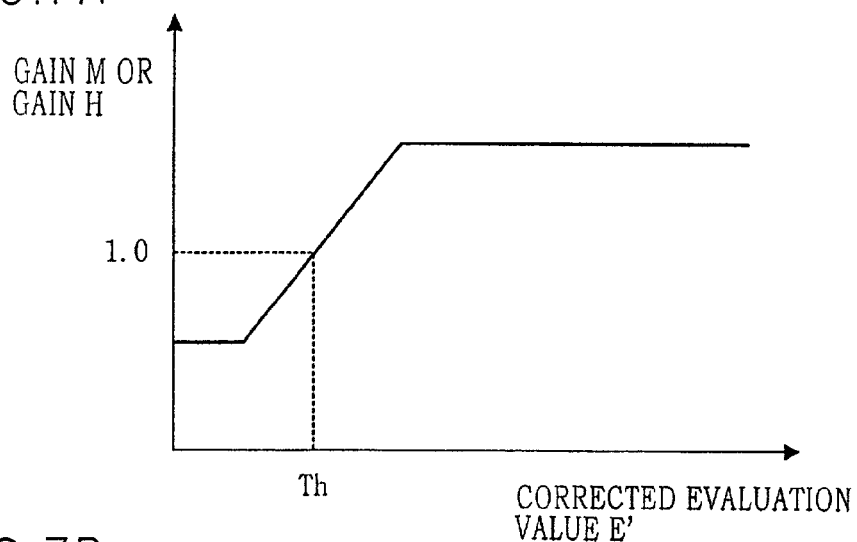
FIGS. 7A to 7C are graphs showing examples of a graph for obtaining a gain for an intermediate or a high frequency component from corrected evaluation values.
Figure 7B:
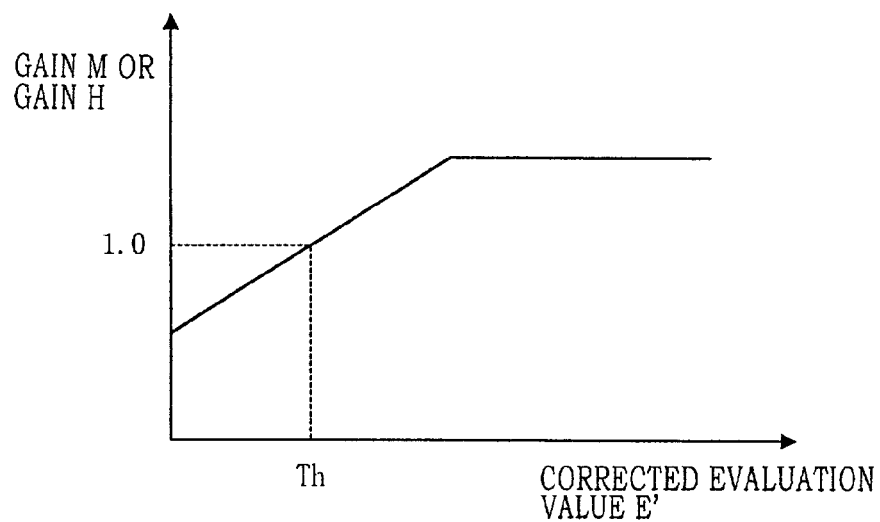
Figure 7C:
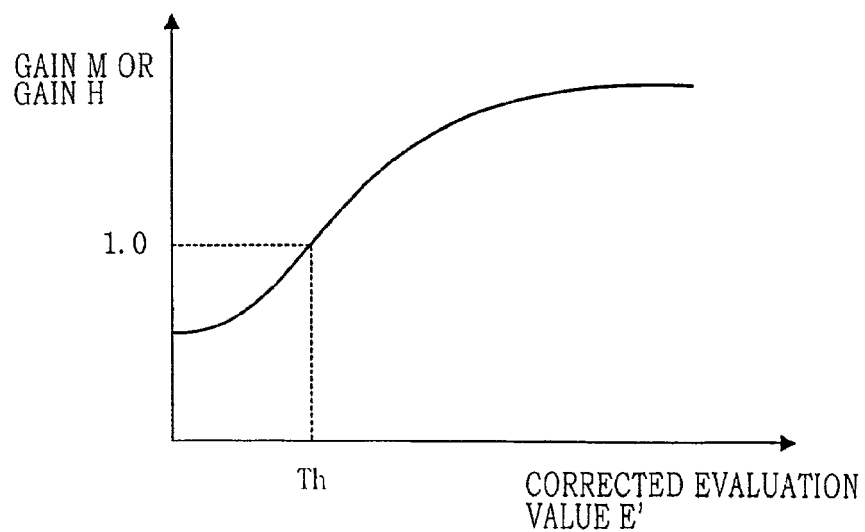

The gain M and the gain H can be obtained by using, for example, the graph in which the relation between the corrected evaluation value E' and the gain M is set, and the graph in which the relation between the evaluation value E' and the gain H is set, respectively (examples of the relations between the evaluation value E' and the gain M or H defined by the graphs are shown in FIGS. 7A to 7C). The graphs shown in FIGS. 7A to 7C are set such that: when the evaluation value E' equals a predetermined threshold value Th, the gain is 1.0, when evaluation value E'>Th, the gain >1.0 (enhancing a corresponding frequency component), and when evaluation value E'<Th, the gain <1.0 (suppressing a corresponding frequency component).

Further, the gain M and the gain H may be set by, for example, comparing the corrected evaluation value E' with the predetermined threshold value Th. For example if evaluation value E'>Th, the gain may be set to be gain=G1 (G1>1.0). If evaluation value E'<Th, the gain may be set to be gain=G2 (G2<1.0).

After the processing of step 220 is carried out, the process proceeds to step 222 and it is determined whether or not the operations of step 216 to step 220 have been carried out for all of the pixels of the image data to be processed. When the determination of step 222 is negative, the process returns to step 216 and the operations of step 216 to step 222 are repeated until the determination of step 222 is affirmative. Thus, the gain M and the gain H are sequentially determined and stored for all of the pixels. The operations of step 216 to step 222 correspond to a setting means of the present invention. When the determination of step 222 is affirmative, the gain determining processing ends.

When the gain control processing is carried out by the second image processing section 60 for the image data to be processed, the gain M, which was determined and stored for each pixel by step 220 (or step 204) of the aforementioned gain determining processing, is inputted to the multiplication circuit 80, and multiplied by the intermediate frequency component $X_M$ by means of the multiplication circuit 80 for each pixel. Further, the gain H, which was determined and stored for each pixel, is inputted to the multiplication circuit 82 at the same time as the aforementioned gain M, and multiplied by the high frequency component $X_H$ by means of the multiplication circuit 82.

As a result, in portions of an image represented by the image data to be processed, in which the level of a noise component superimposed on the image data to be processed is estimated to be high, or enhancement of the noise component by gradation conversion is predicted, the corrected evaluation value E' is made relatively smaller by making the evaluation correction value V of a corresponding pixel relatively larger. The gain of the corresponding pixel is controlled in accordance with the gain made relatively smaller based on the corrected evaluation value E'. Therefore, image data of favorable image quality (corrected image data X'), in which sharpness of an image is improved by enhancing an image component to be enhanced while suppressing enhancement of a noise component superimposed on the image data to be processed, can be obtained.

When the image data to be processed is image data other than the film image data and the DSC image data, for example, image data in which the level of a superimposed noise component is very low and the correlation between the level of a noise component and the density level is estimated to be small, such as image data generated by information processing equipment such as a computer and received by the image data receiving device 16 via a computer network, the determination of step 202 in the gain determining processing (FIG. 3) is negative and the process proceeds to step 204.

In step 204, the gain M and the gain H are determined by the graphs shown in FIGS. 7A to 7C and the determined gain M and gain H are stored in RAM or the like, without using a corrected evaluation value calculated for each pixel in step 200 in a conventional manner, and the gain determining processing ends. In this case, image data (corrected image data X') can be obtained, in which the sharpness of an image is improved on the entire surface of the image without being affected by the noise component.

By displaying the image data subjected to the gain control processing, as a simulation image, on the CRT 20 or the like, it is possible for an operator to perform fine adjustments to the gain M and the gain H.

In the above, the image data to be processed is separated into three frequency components, that is, a low frequency component $X_L$, an intermediate frequency component $X_M$ and a high frequency component $X_H$. However, the number of separated frequency components is not limited to three. The image data may also be separated into a larger number of frequency components, or separated into only two frequency components (for example, a low frequency component $X_L$ and an intermediate/high frequency component $X_{MH}$).

Further, in the above, a large number of film types from which film images can be read by the film scanner 12 are classified into groups based on the relation between the density level and the noise component for each film type, and evaluation-value correction data is set and stored for each of the representative film types. However, the present invention is not limited to the same. For example, a large number of film types are classified into groups based on the total noise component for each film type in the same manner as in the evaluation-value correction data for the DSC image data, and the evaluation-value correction data may be set and stored for each of the groups. In this case, when the evaluation-value correction data used for correcting an evaluation value is obtained, a simulation image displayed on the CRT 20 or the like is inspected by an operator, and the result of determination about the noise component, which is inputted by the operator via the key input section 64, is read out, and the noise component is detected, and further, evaluation-value correction data corresponding to the detected noise component may be selected.

Moreover, in the above, a case was described in which the evaluation correction value V corresponding to the density level of the specified pixel is obtained, the evaluation value E is corrected by the evaluation correction value V, and based on the corrected evaluation value E', the gain is obtained. However, the present invention is not limited to the same. For example, a method may also be applied, in which graphs, which indicate the relationship among the evaluation value E, density level D and the gain, are prepared, and the gain is directly obtained from the evaluation value E and the density level D by means of the graphs.

As described above, in accordance with the first and third aspects of the present invention, image data to be processed is separated into a plurality of frequency components, an evaluation value for evaluating the level of an image component to be enhanced is calculated for each pixel, a gain for at least one frequency component is set for each pixel based on the calculated evaluation value and the density level of the object pixel. Based on the gain set for each object pixel, at least one frequency component is enhanced or suppressed for each pixel and a plurality of frequency components are synthesized. Accordingly, an excellent effect is obtained, in which it is possible to emphasize sharpness of an image while suppressing enhancement of the noise component superimposed on image data.

Further, the evaluation value is corrected for each pixel in accordance with the density level of the specified pixel and the gain is set for each pixel based on the corrected evaluation value. Therefore, in addition to the aforementioned effect, it is possible to reduce a storage capacity of the storage means for necessary information by setting the gain in consideration of the density level, and it is also possible to set the gain by simple processing.

In accordance with the second aspect of the present invention, information is stored in the storage means, which information indicates the relation between the density level and an evaluation value corresponding to the noise component, which relation is obtained in advance by calculating an evaluation value for all of the plurality of test image data for the test images, which have a constant density over the entire surface thereof but have densities different from each other. An evaluation value corresponding to the noise component at the density level of the object pixel is obtained as an evaluation correction value for each pixel, and the evaluation value is corrected by the evaluation correction value. Therefore, in addition to the aforementioned effects, an excellent effect is obtained, in which the evaluation value to suppress enhancement of a noise component superimposed on the image data can be corrected by a simple calculation.

Further, when image data for evaluation is image data which indicates an test image recorded on a first photographic film and image data to be processed is the image data which indicates an image recorded on a second photographic film of a type different from the first photographic film, the evaluation correction value is corrected based on the ratio of the evaluation value corresponding to the noise component between the first and second photographic films, and used. Therefore, in addition to the aforementioned effects, an effect is obtained in which the storage capacity of the storage means can be reduced.

Moreover, when the image data to be processed is the image data which has been subjected to gradation conversion, the evaluation correction value is corrected in accordance with the gradation conversion condition used for gradation conversion, and used. Therefore, in addition to the aforementioned effects, an effect is obtained, for the image data, which has been subjected to gradation conversion, in which the sharpness of an image can be enhanced while suppressing enhancement of the noise component as well.

In accordance with the fourth aspect of the present invention, a program for allowing a computer to execute processing, including a first step of separating image data to be processed, into a plurality of frequency components and calculating, for each pixel, an evaluation value for evaluating the level of an image component to be enhanced, a second step of setting, per pixel, the gain for at least one frequency component based on the calculated evaluation value, and the density level of the specified pixel, a third step of enhancing or suppressing at least one frequency component per pixel based on the gain set for each pixel, and a fourth step of synthesizing plural frequency components, is recorded on a recording medium. Therefore, an excellent effect is obtained, in which it becomes possible to emphasize the sharpness of an image while suppressing enhancement of the noise component superimposed on the image data.

What is claimed is:

1. An image processing apparatus comprising:
   a separating means for separating image data to be processed into a plurality of different frequency components;
   an evaluation-value calculating means for calculating for each pixel an evaluation value for evaluating a level of an image component to be enhanced in the image data;
   a setting means for setting for each pixel a gain for at least one of the frequency components based on the evaluation value calculated by the evaluation-value calculating means, and a density of one of a pixel to be set and a pixel region that includes the pixel to be set;
   an enhancing/suppressing means for performing for each pixel one of enhancing and suppressing at least one frequency component based on the gain set by the setting means; and
   a synthesizing means for synthesizing the plurality of frequency components including the frequency component, which is processed, for each pixel, by the enhancing/suppressing means.

2. The image processing apparatus of claim 1, wherein the setting means corrects, for each pixel, the evaluation value calculated by the evaluation-value calculating means in accordance with the density of one of the pixel to be set and the pixel region including the pixel to be set, and sets the gain for each pixel based on the corrected evaluation value.

3. The image processing apparatus of claim 1, wherein the evaluation-value calculating means calculates as the evaluation value at least one of a color dispersion, a density dispersion, a color correlation, a density difference and a rate of change in density for a portion of an image represented by the image data in the vicinity of the pixel to be calculated.

4. The image processing apparatus of claim 2, wherein the evaluation-value calculating means calculates as the evaluation value at least one of a color dispersion, a density dispersion, a color correlation, a density difference and a rate of change in density for a portion of an image represented by the image data in the vicinity of the pixel to be calculated.

5. The image processing apparatus of claim 2, wherein the setting means sets the gain by comparing the corrected evaluation value with a threshold value.

6. The image processing apparatus of claim 2, wherein the setting means sets the gain which is obtained, based on a predetermined relation between evaluation values and gains, using the corrected evaluation value.

7. The image processing apparatus of claim 2, further comprising storage means for storing information indicating a relation between the density and the evaluation value corresponding to a noise component superimposed on image data for evaluation, which relation has been obtained in advance by calculating an evaluation value for each of a plurality of evaluation image data, which plurality is generated, in substantially the same way as an image represented by the image data to be processed, from at least one of:
 a plurality of test images, each having a constant density over the entire surface thereof and having densities different from each other; and
 an test image in which a plurality of test patches having different densities are arranged;
 wherein the setting means corrects the evaluation value calculated by the evaluation-value calculating means using the evaluation correction value corresponding to the evaluation value of the noise component at a density of at least one of the pixel to be set, and the pixel region comprising the pixel to be set, and the evaluation correction value is obtained based on the information stored in the storage means for each of the pixels to be set, corresponding to the noise component at a density of one of the pixel to be set, and the pixel region comprising the pixel to be set.

8. The image processing apparatus of claim 7, wherein when the image data for evaluation is image data representing the test image recorded on a first photographic film, and the image data to be processed is image data representing an image recorded on a second photographic film of a film type different from the first photographic film, the setting means corrects and uses an evaluation correction value obtained from the information stored in the storage means based on a ratio of the evaluation values corresponding to a noise component in the first and second photographic films.

9. The image processing apparatus of claim 7, wherein when the image data to be processed is image data that has been subjected to gradation conversion, the setting means corrects and uses the evaluation correction value in accordance with gradation conversion conditions used in the gradation conversion.

10. The image processing apparatus of claim 9, wherein the setting means corrects the evaluation correction value in accordance with the gradation conversion conditions by correcting a relation between the density and the evaluation value corresponding to the noise component, which are stored in the storage means, based on an input-output changing ratio of the gradation conversion conditions at different densities and by obtaining the evaluation correction value using the corrected relation.

11. An image processing method comprising the steps of:
 separating image data to be processed into a plurality of different frequency components, and calculating for each pixel an evaluation value which evaluates a level of an image component to be enhanced in the image data;
 setting a gain for at least one of the frequency components for each pixel based on the calculated evaluation value and a density of one of the pixel to be set and a pixel region including the pixel to be set;
 carrying out a process for one of enhancing and suppressing at least one frequency component for each pixel, based on the gain set for each pixel; and
 synthesizing the frequency components, which includes the frequency component subjected to one of enhancing and suppressing process for each pixel.

12. A recording medium on which computer executable-instructions are recorded for performing processing on a computer comprising the steps of:
 separating image data to be processed into a plurality of different frequency components, and calculating for each pixel an evaluation value for evaluating a level of an image component to be enhanced in the image data;
 setting for each pixel a gain for at least one of the frequency components based on the calculated evaluation value and a density of one of a pixel to be set and a pixel region including the pixel to be set;
 carrying out a process for one of enhancing and suppressing at least one frequency component for each pixel based on the gain set for each pixel; and
 synthesizing for each pixel the frequency components, which include the frequency component subjected to one of the enhancing and suppressing process.

13. The recording medium of claim 12, wherein the step of synthesizing includes combining the frequency component subjected to one of the enhancing and suppressing together with the other frequency components to thereby produce image data having said image component enhanced.

14. The recording medium of claim 12, wherein the step of separating includes separating the image data into a lower frequency component that does not substantially comprise a noise component and a higher frequency component that includes the image component to be enhanced and a noise component.

15. The recording medium of claim 12, where the step of separating includes using at least one filter to separate out at least one frequency component.

16. An apparatus for processing image data representing an image as a plurality of pixels, the apparatus comprising a computer including a CPU, memory system, and program logic, the program logic which when executed by the computer performs processing of image data, said processing comprising:
 (a) separating the image data to be processed into a plurality of different frequency components;
 (b) determining an evaluation value for evaluating a level of an image component to be enhanced in the image data;
 (c) setting for each pixel a gain for at least one of the frequency components based on the evaluation value and a density of one of a pixel to be set and a pixel region that includes the pixel to be set;
 (d) modifying for each pixel at least one frequency component based on said gain; and
 (e) synthesizing for each pixel said modified at least one frequency component together with the remaining plurality of different frequency components, thereby producing image data having said component enhanced.

17. The apparatus of claim 16, where the plurality of different frequency components includes at least three different frequency components.

18. The apparatus of claim 16, wherein the memory system includes a RAM and hard disk, and the program logic is stored on the hard disk and at least partially read into the RAM when being executed by the computer.

19. The apparatus of claim 16, wherein separating the image data includes using a low pass filter to extract a lower frequency component from the image data.

20. The apparatus of claim 19, wherein separating the image data includes extracting another frequency of higher frequency than the lower frequency component, by subtracting the lower frequency component from the image data.

* * * * *